United States Patent
Byun

(10) Patent No.: US 10,411,630 B2
(45) Date of Patent: Sep. 10, 2019

(54) INVERTER CONTROL APPARATUS

(71) Applicant: LSIS CO., LTD., Anyang-si, Gyeonggi-do (KR)

(72) Inventor: Sunghoon Byun, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/863,248

(22) Filed: Jan. 5, 2018

(65) Prior Publication Data

US 2018/0254729 A1 Sep. 6, 2018

(30) Foreign Application Priority Data

Mar. 6, 2017 (KR) .................. 10-2017-0028277

(51) Int. Cl.
| | |
|---|---|
| *H02P 23/00* | (2016.01) |
| *H02P 21/16* | (2016.01) |
| *H02P 21/04* | (2006.01) |
| *H02P 27/04* | (2016.01) |
| *H02P 21/34* | (2016.01) |
| *H02P 1/02* | (2006.01) |
| *H02P 1/28* | (2006.01) |

(52) U.S. Cl.
CPC .............. *H02P 21/04* (2013.01); *H02P 1/028* (2013.01); *H02P 1/28* (2013.01); *H02P 21/34* (2016.02); *H02P 27/047* (2013.01)

(58) Field of Classification Search
CPC ........... H02P 23/00; H02P 21/16; H02P 21/04
See application file for complete search history.

(56) References Cited

U.S. PATENT DOCUMENTS

| | | | |
|---|---|---|---|
| 2003/0160585 A1 | 8/2003 | Na | |
| 2008/0180054 A1* | 7/2008 | Kinpara | .................. H02P 21/16 318/720 |

(Continued)

FOREIGN PATENT DOCUMENTS

| | | |
|---|---|---|
| EP | 3021479 A1 | 5/2016 |
| JP | 1995107781 A | 4/1995 |
| JP | H0974786 A | 3/1997 |

(Continued)

OTHER PUBLICATIONS

European Search Report for related European Application No. 17203269.0; action dated May 23, 2018; (7 pages).

(Continued)

*Primary Examiner* — Bickey Dhakal
*Assistant Examiner* — Cortez M Cook
(74) *Attorney, Agent, or Firm* — K&L Gates LLP

(57) ABSTRACT

The apparatus according to the present invention comprises a command voltage determination circuit section configured to determine a predetermined first compensation voltage as a command voltage upon initial startup and provide the command voltage to an inverter; a conversion circuit section configured to convert an output current of the inverter into a q-axis current on a synchronous reference frame; and a compensation voltage determination circuit section configured to determine a second compensation voltage based upon the q-axis current and to provide the second compensation voltage to the command voltage determination circuit section.

4 Claims, 3 Drawing Sheets

(56) References Cited

U.S. PATENT DOCUMENTS

2015/0155815 A1* 6/2015 Yoo .................. H02P 23/00
                                                        318/808
2016/0134219 A1   5/2016 Kim

FOREIGN PATENT DOCUMENTS

| JP | 2596521 Y | 4/1999 |
| JP | 1999103597 A | 4/1999 |
| JP | 2003037999 A | 2/2003 |
| JP | 2005089127 A | 4/2005 |
| JP | 2016096715 A | 5/2016 |
| KR | 20090105065 A | 10/2009 |
| KR | 20150062562 A | 6/2015 |
| KR | 1020160109136 A | 9/2016 |
| WO | 2017006485 A1 | 1/2017 |

OTHER PUBLICATIONS

Japanese Office Action for related Japanese Application No. 2017-245230; action dated Aug. 7, 2018; (3 pages).
Korean Office Action for related Korean Application No. 10-2017-0028277; action dated Oct. 1, 2018; (4 pages).
Japanese Office Action for related Japanese Application No. 2017-245230 action dated Mar. 26, 2019; (4 pages).

* cited by examiner

INVERTER CONTROL APPARATUS

CROSS-REFERENCE TO RELATED APPLICATION

Pursuant to 35 U.S.C. § 119(a), this application claims the benefit of earlier filing date and right of priority to Korean Application No. 10-2017-0028277, filed on Mar. 6, 2017, the contents of which is incorporated by reference herein in its entirety.

BACKGROUND OF THE INVENTION

1. Field of the Invention

The present invention relates to an inverter control apparatus.

2. Background of the Invention

Generally, an inverter is a power conversion device that receives commercial alternating current (AC) power, converts the AC power into direct current (DC) power, reconverts the DC power into AC power suitable for a motor, and supplies the AC power to the motor. Such an inverter efficiently controls a motor to decrease power consumption of the motor, thereby improving energy efficiency.

In many application loads of industrial fields, an inverter is controlled by a voltage/frequency (abbreviated as "V/F" hereinafter) control method, the control method is mainly used in fields such as a fan, a pump, and a blower that do not require fast dynamic characteristics in a driving area below a rated speed.

Also, in an ascending/descending load such as an elevator or a crane, an encoder, which is a position sensor for measuring an absolute position of a motor or a relative position of the motor according to a rotation state of the motor, may be used to precisely control a speed and thus achieve high starting torque performance. However, in some systems, V/F control is performed due to costs incurred for maintenance of an encoder.

However, when an inverter is controlled by V/F control, starting torque may be insufficient due to a voltage drop caused by stator resistance and leakage inductance of a motor in a slow driving area in which an output voltage of the inverter is low. Also, a starting failure due to the insufficiency of the starting torque causes an excessive current, which may cause a failure of the inverter or a failure of the motor.

SUMMARY OF THE INVENTION

Therefore, an object of the present disclosure is to provide an inverter control apparatus for stably starting a system requiring high starting torque and fast response when a brake is released by improving an insufficiency of the starting torque due to a voltage drop upon voltage or frequency control.

To achieve these and other advantages and in accordance with the purpose of this disclosure, as embodied and broadly described herein, there is provided an apparatus for controlling an inverter for driving a motor, the apparatus comprising: a command voltage determination circuit section configured to determine a predetermined first compensation voltage as a command voltage upon initial startup and provide the command voltage to the inverter; a conversion circuit section configured to convert an output current of the inverter into a torque component current on a synchronous reference frame; and a compensation voltage determination circuit section configured to determine a second compensation voltage based upon the torque component current and provide the second compensation voltage to the command voltage determination circuit section.

According to an preferred aspect of this disclosure, the command voltage determination circuit section is configured to provide, to the inverter, with a second command voltage determined by compensating the second compensation voltage to a first command voltage determined in consideration of the first compensation voltage.

According to another preferred aspect of this disclosure, the command voltage determination circuit section is configured to fix a target command voltage and output the fixed target command voltage when a command frequency of the inverter reaches a target frequency.

According to still another preferred aspect of this disclosure, the compensation voltage determination circuit section comprises an amplifier configured to amplify the torque component current with a gain and output the second compensation voltage, and the gain corresponds to stator resistance.

According to still another preferred aspect of this disclosure, the compensation voltage determination circuit section comprises: a first amplifier that amplifies a predetermined rated torque component current by a first gain to output the amplified rated torque component current; a subtractor that subtracts the amplified rated torque component current output from the first amplifier from the torque component current; a comparator that compares an output of the subtractor with a predetermined reference current value to output a logic high output when the output of the subtractor is not less than the predetermined reference current value; a multiplier that multiplies the output from the comparator by the torque component current to output the torque component current when an output of the comparator is a logic high output; a low pass filter that attenuates a ripple component of the torque component current to output the torque component current from which ripple component is removed; and a second amplifier that amplifies the torque component current output from the low pass filter with a second gain and outputs the amplified torque component current as the second compensation voltage.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

In order to fully understand configurations and advantageous effects of the present invention, exemplary embodiments of the present invention will be described with reference to the accompanying drawings.

Hereinafter, a conventional inverter control apparatus and then an inverter control apparatus according to an embodiment of the present invention will be described with reference to the accompanying drawings.

Figure 1:
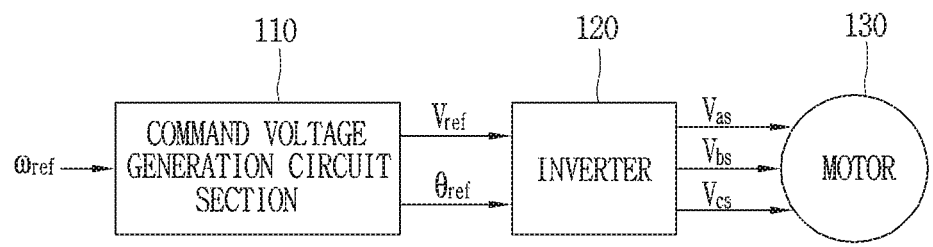
FIG. 1 is a block diagram schematically showing a conventional voltage/frequency control type inverter system.

FIG. 1 is a block diagram schematically showing a conventional voltage/frequency control type inverter system.

When a user inputs a command frequency $\omega_{ref}$, a command voltage generation circuit section 110 can determine a magnitude $V_{ref}$ and a phase angle $\theta_{ref}$ of a command voltage of an inverter 120 corresponding to the command frequency $\omega_{ref}$. The inverter 120 synthesizes three-phase pulse width modulation (PWM) voltages $V_{as}$, $V_{bs}$, and $V_{cs}$ corresponding to a command voltage of a motor 130 based upon the magnitude $V_{ref}$ and phase angle $\theta_{ref}$ of the command voltage of the inverter 120 determined by the command voltage generation circuit section 110 and drives an induction motor 130 according to the three-phase PWM voltages $V_{as}$, $V_{bs}$, and $V_{cs}$.

Figure 2:
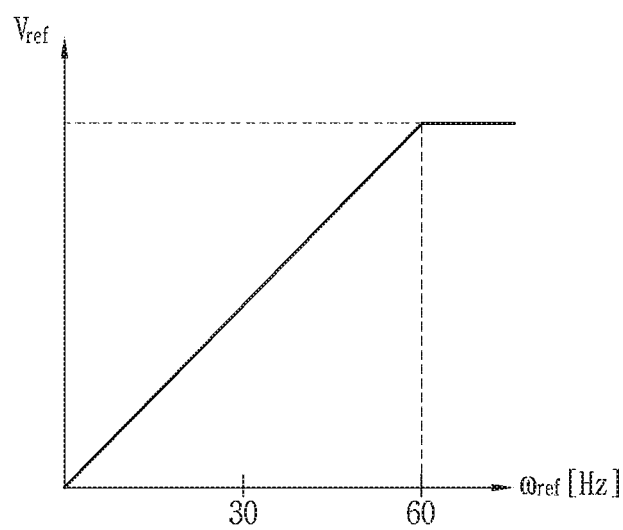
FIG. 2 is an example diagram illustrating an example in which a command voltage is determined according to a command frequency by a command voltage generation circuit section of FIG. 1.

FIG. 2 is an example diagram illustrating an example in which a command voltage is determined according to a command frequency by the command voltage generation circuit section of FIG. 1. It can be seen that an output frequency of the inverter 120 is proportional to an output voltage magnitude.

In FIG. 2, upon initial startup, the command frequency $\omega_{ref}$ increases starting from zero, and also an output voltage, the command voltage $V_{ref}$ of the inverter increases starting from zero according to a frequency-voltage relationship. That is, the command voltage increases proportionally as the command frequency $\omega_{ref}$ increases. When the command frequency $\omega_{ref}$ reaches a target frequency, the inverter 120 drives the motor 130 with a constant speed.

When the motor 130 is driven as shown in FIG. 2, an output voltage is generated in proportion to a frequency in a slow driving area upon initial startup, and thus the output voltage is low. Furthermore, a voltage needed to drive the motor 130 actually decreases due to a voltage drop caused by stator resistance and leakage inductance of the motor 130. This significantly increase a starting current and causes failures of the inverter 120 and the motor 130 and a startup failure.

In order to prevent this, the voltage should be boosted in the slow driving area in consideration of a voltage drop due to stator impedance.

Figure 3:
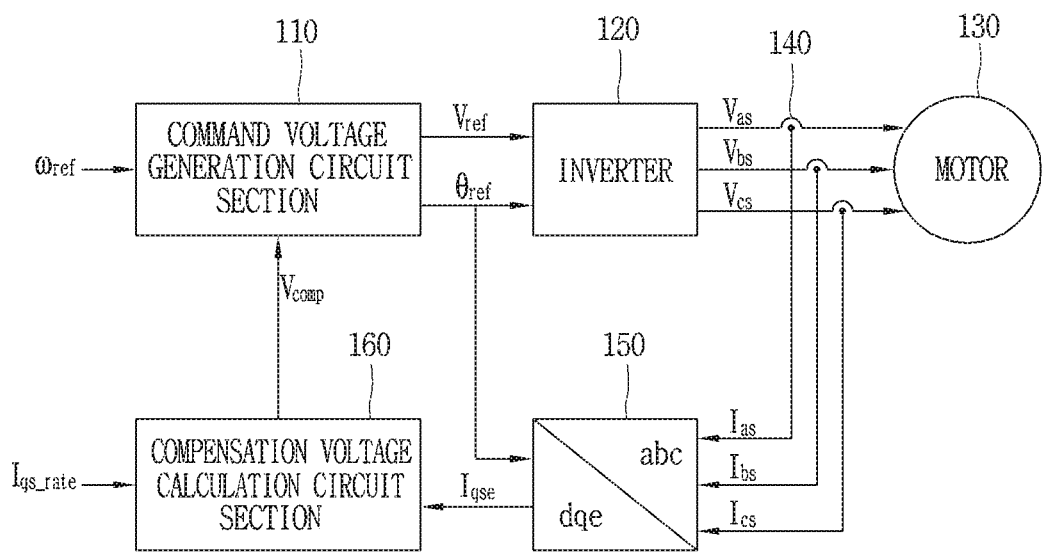
FIG. 3 is a block diagram illustrating a conventional inverter control apparatus.

FIG. 3 is a block diagram illustrating a conventional inverter control apparatus in which a conversion circuit section 150 and a compensation voltage calculation circuit section 160 are added to the system of FIG. 1.

Like FIG. 1, the command voltage generation circuit section 110 determines a magnitude $V_{ref}$ and a phase angle $\theta_{ref}$ of an output command voltage corresponding to a command frequency $\omega_{ref}$, and the inverter 120 synthesizes three-phase PWM voltages corresponding to the command voltage and drives the motor 130 according to the three-phase PWM voltages $V_{as}$, $V_{bs}$, and $V_{cs}$.

The conversion circuit section 150 converts three-phase currents of the motor 130 measured by a measurement circuit section 140 into a d-axis (a magnetic flux axis) current (in other words a magnetic flux component current) $I_{dse}$ and a q-axis (a torque axis) current (in other words a torque component current) $I_{qse}$ on a synchronous reference frame, and a compensation voltage calculation circuit section 160 determines a compensation voltage using (based upon) the q-axis current $I_{qse}$. Coordinate conversion to $I_{qse}$ is determined as follows:

$$I_{qse}=-\tfrac{2}{3}(I_{as}\sin\theta+I_{bs}\sin(\theta-\tfrac{2}{3}\pi)+I_{cs}\sin(\theta+\tfrac{2}{3}\pi)) \quad \text{[Equation 1]}$$

where $\theta$ is the phase angle $\theta_{ref}$ of the command voltage.

$I_{qse}$ is in-phase with the output voltage of the inverter 120 and corresponds to a torque component current proportional to load torque. Accordingly, the magnitude of the load torque can be known from the magnitude of torque component current $I_{qse}$. Required starting torque increases as a load of the motor 130 increases. Accordingly, the compensation voltage calculation circuit section 160 compensates a voltage proportional to the torque component current $I_{qse}$ according to the frequency-voltage relationship of FIG. 2 to increase the starting torque.

However, according to the method, a load such as a fan, a pump, or a blower in which only a friction load operates upon startup has slow response characteristics, and thus there is no problem in use. However, the method is not appropriate for a system to which an instantaneous step load is applied when a system requiring large starting torque, that is, a brake is released in ascending and descending loads such as an elevator or a crane.

That is, a system requiring high starting torque when a brake is released can be normally started up only when fast voltage compensation should be achieved at initial startup. However, the compensation voltage calculation circuit section 160 determines a compensation voltage based upon the torque component current $I_{qse}$ after the motor 130 is started up, and thus response characteristics for this are slowed down. Also, since appropriate voltage compensation is not achieved, an excessive current flows by a starting failure due to the insufficiency of the starting torque, which causes failures of the inverter 120 and the motor 130.

According to the present invention, it is possible to compensate for a voltage drop due to stator impedance and provide an inverter control apparatus having improved starting torque in a system such as an elevator or a crane requiring large starting torque and fast response characteristics when a brake is released.

Figure 4:
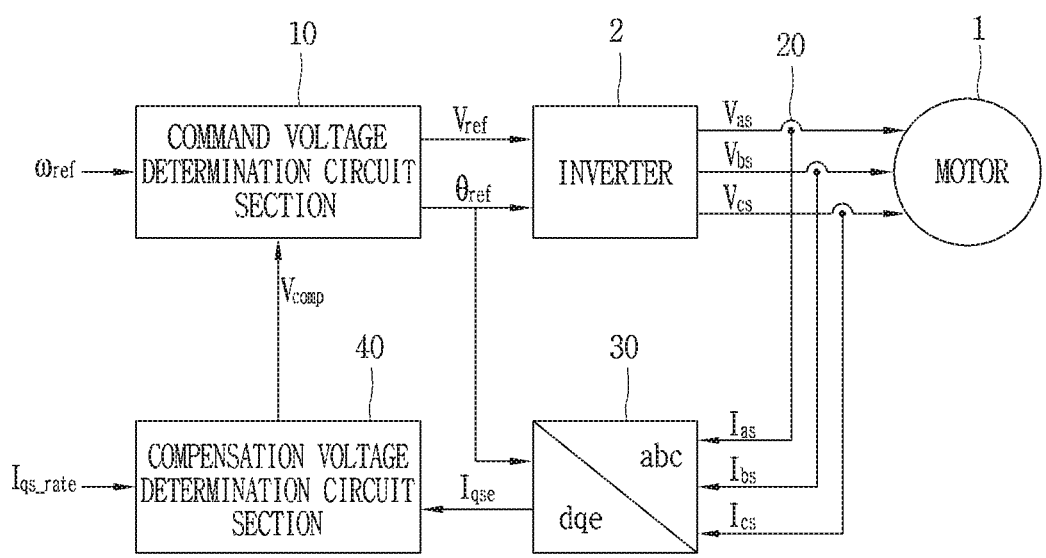
FIG. 4 is a block diagram schematically illustrating an inverter control apparatus according to an embodiment of the present invention.

FIG. 4 is a block diagram schematically illustrating an inverter control apparatus according to an embodiment of the present invention.

As shown in FIG. 4, an inverter control apparatus according to an embodiment of the present invention is configured to control an inverter 2 that outputs a voltage having a predetermined magnitude and frequency to a motor 1 and may include a command voltage determination circuit section 10, an output current detection circuit section 20, a conversion circuit section 30, and a compensation voltage determination circuit section 40.

When a user inputs a command frequency $\omega_{ref}$ through a user input unit (not shown) such as a keypad provided on a housing of the inverter 2, the command voltage determination circuit section 10 can determine a magnitude $V_{ref}$ and a phase angle $\theta_{ref}$ of a command voltage of the inverter 2 corresponding to the command frequency $\omega_{ref}$.

The inverter 2 can synthesize three-phase PWM voltages $V_{as}$, $V_{bs}$, and $V_{cs}$ corresponding to the command voltage of the motor 1 based upon the magnitude $V_{ref}$ and phase angle $\theta_{ref}$ of the command voltage determined by the command voltage determination circuit section 10 and can drive the motor 1 according to the synthesized three-phase PWM voltages $V_{as}$, $V_{bs}$, and $V_{cs}$.

Figure 5:
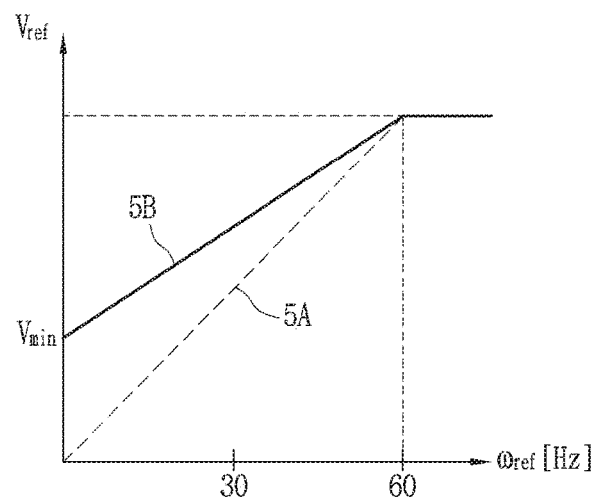
FIG. 5 is an example diagram illustrating a frequency-voltage relationship determined according to an embodiment of the present invention.

FIG. 5 is an example diagram illustrating a frequency-voltage relationship determined according to an embodiment of the present invention. Dot line 5A in FIG. 5 shows a conventional frequency-voltage relationship of FIG. 2, and solid line 5B in FIG. 5 shows a frequency-voltage relationship according to an embodiment of the present invention.

That is, referring to dot line 5A, the command frequency $\omega_{ref}$ increases starting from zero, and the magnitude of the command voltage $V_{ref}$ of the inverter 120 also increases starting from zero. However, the command voltage determination circuit section 10 according to an embodiment of the present invention can be configured to output the magnitude of the command voltage $V_{ref}$ according the frequency-voltage relationship of solid line 5B such that the command frequency increases starting from zero and the magnitude of the command voltage $V_{ref}$ of the inverter 2 increases starting from $V_{min}$. When the command frequency $\omega_{ref}$ reaches a target frequency, the command frequency no longer changes and the driving is performed at a constant speed. Accordingly, the output voltage, that is the magnitude of the command voltage $V_{ref}$ of the inverter 2 may also be fixed. In this case, as shown in FIG. 5, it can be seen that the output voltage, that is the magnitude of the command voltage $V_{ref}$ reaches a target command voltage when the command frequency $\omega_{ref}$ reaches the target frequency. That is, upon initial startup where the command frequency $\omega_{ref}$ is zero, the command voltage is determined as being $V_{min}$, but the slope in solid line 5B is more moderate than the slope in dot line 5A. Accordingly, it can be seen that the command voltage (the magnitude of the command voltage) increases with a smaller slope than a slope of the conventional case as the command frequency increases.

When the command frequency $\omega_{ref}$ is zero, the output voltage, that is the initial magnitude of the command voltage $V_{min}$ determined by the command voltage determination circuit section 10 may be predetermined (preset) by a user according to characteristics of the motor 1. In this case, a trip (automatic circuit breaking by a circuit breaker installed between the inverter and the motor) may occur when an excessively high voltage as the initial magnitude of the command voltage $V_{min}$ is set, and it becomes impossible to move a load such as an elevator when an excessively low voltage is set.

Accordingly, according to an embodiment of the present invention, when the motor 1 is driven, the starting failure due to the voltage drop caused by stator resistance and leakage inductance can be prohibited by the compensating voltage according to the initial magnitude of the command voltage $V_{min}$, and then subsequent load compensation can be performed by the compensation voltage determination circuit section 40.

The conversion circuit section 30 converts three-phase output currents (static reference frame currents; e.g., $I_{as}$, $I_{bs}$, and $I_{cs}$) of the inverter 2 measured by the output current detection circuit section 20 into a d-axis current (a magnetic flux component current) $I_{dse}$ and a q-axis current (torque component current) $I_{qse}$ on a synchronous reference frame, and the compensation voltage determination circuit section 40 can determine a compensation voltage $V_{comp}$ based upon the q-axis current $I_{qse}$.

The q-axis current (the torque component current) $I_{qse}$ is inphase with the output voltage of the inverter 2 and corresponds to a torque component current proportional to load torque. Accordingly, as described above, the magnitude of the load torque can be seen from the magnitude of the q-axis current(torque component current) $I_{qse}$. Required starting torque increases as a load of the motor 1 increases. Accordingly, the compensation voltage determination circuit section 40 can provide a compensating voltage proportional to the torque component current $I_{qse}$ over the command voltage according to the frequency-voltage relationship of FIG. 5 to increase the starting torque.

Figure 6:
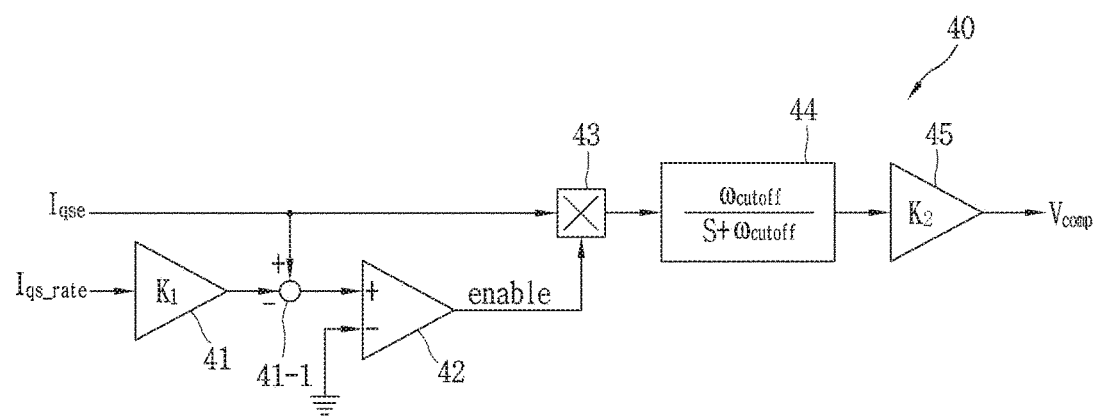
FIG. 6 is a block diagram showing detailed configuration of a compensation voltage determination circuit section of FIG. 4 according to an embodiment of the present invention.

FIG. 6 is a detailed block diagram showing an example of the compensation voltage determination circuit section 40 of FIG. 4.

As shown in FIG. 6, the compensation voltage determination circuit section 40 according to the present invention comprises a first amplifier 41, a subtractor 41-1, a comparator 42, a multiplier 43, a low pass filter (LPF) 44, and a second amplifier 45.

The first amplifier 41 is configured to amplify a preset (predetermined) rated torque component current $I_{qs\_rate}$ by a first gain $K_1$. That is, the first amplifier 41 is configured to provide the rated torque component current $I_{qs\_rate}$ multiplied by the first gain $K_1$.

The subtractor 41-1 is configured to subtract a rated torque component current $I_{qs\_rate}$ multiplied by the first gain $K_1$ of the first amplifier 41 from the measured torque component current $I_{qse}$ to output a difference value.

The subtractor 41-1 has two inputs, one of the both inputs is connected to output of the conversion circuit section 30(shown in FIG. 4) and the other of the both inputs is connected to output of the first amplifier 41.

The compensation voltage determination circuit section 40 according to an embodiment of the present invention can determine whether to perform voltage compensation by means of the comparator 42 before determining the compensation voltage $V_{comp}$. That is, compensation voltage determination circuit section 40 can include the multiplier 43 configured to multiply the output from the comparator 42 by the torque component current $I_{qse}$ to output output the torque component current $I_{qse}$ to the LPF 44 when an output of the comparator 42 is an enable (i.e., a logic high output).

The multiplier 43 has two inputs, one of the both inputs is connected to output of the comparator 42 and the other of the both inputs is connected to output of the conversion circuit section 30(shown in FIG. 4).

The comparator 42 may compare the difference value output from the subtractor 41-1 with a low reference current value (for example zero) and may output an enable output (i.e., a logic high output) when the difference value is not less than the low reference current value.

The comparator 42 has two inputs, one of the both inputs is connected to the subtractor 41-1 and the other of the both inputs is connected to an earth(ground) to receive a zero input value.

According to another preferred embodiment, the other of the both inputs in the comparator 42 is not connected to the earth(ground) but connected to other reference value input circuit section (for example an input circuit section configured with a constant current source and resistors).

As described as above, by the compensation voltage determination circuit section 40 according to an embodiment of the present invention, after comparing the rated torque current $I_{qs\_rate}$ multiplied by the first gain $K_1$ of the first amplifier 41 with the measured torque current $I_{qse}$, the compensation voltage $V_{comp}$ is not output upon a loadless case or a light load case (when the difference value is zero or a smaller value of the low reference current value), but is output when the torque is insufficient (when the difference value is not less than the low reference current value).

A value smaller than 1 (one) may be appropriately chosen as the first gain $K_1$.

The LPF 44 can improve stability by attenuating (removing) a ripple component from the torque component current $I_{qse}$.

An input of the LPF 44 is connected to the output of the multiplier 43, and an output of the LPF 44 is connected to an input of the second amplifier 45.

The second amplifier 45 can multiply the torque component current $I_{qse}$ having passed through the LPF 44 by a second gain $K_2$ to output the compensation voltage $V_{comp}$. According to a preferred aspect of the present invention, the second gain $K_2$ can be preset as a value corresponds to (same as) the stator resistance. And the second gain $K_2$ may be preset to be different values depending on application fields (e.g., a crane, an elevator, etc.).

The compensation voltage $V_{comp}$ determined by the compensation voltage determination circuit section 40, that is the compensation voltage $V_{comp}$ output from the second amplifier 45 can be provided to the command voltage determination circuit section 10 to be compensated for the command voltage determined by the command voltage determination circuit section 10, and the compensated command voltage can be output to the inverter 2.

As described as above, the apparatus for controlling an inverter according to present invention can perform stable startup by compensating a predetermined voltage for an insufficient voltage upon initial startup in an ascending and descending load requiring fast dynamic characteristics in order to compensate a voltage drop due to stator impedance and then can perform stable drive of the inverter by determining and compensating a compensation voltage according to a variance of the load.

What is claimed is:

1. An apparatus for controlling an inverter for driving a motor, the apparatus comprising:
    a command voltage determination circuit section that determines a predetermined first compensation voltage as a first command voltage upon initial startup and provides the first command voltage to the inverter;
    a conversion circuit section that converts an output current of the inverter into a torque component current on a synchronous reference frame; and
    a compensation voltage determination circuit section that determines a second compensation voltage based upon the torque component current and provides the second compensation voltage to the command voltage determination circuit section,
    wherein the compensation voltage determination circuit section comprises:
        a first amplifier that amplifies a predetermined rated torque component current by a first gain to output the amplified rated torque component current;
        a subtractor that subtracts the amplified rated torque component current output from the first amplifier from the torque component current;
        a comparator that compares an output of the subtractor with a predetermined reference current value to output a logic high output when the output of the subtractor is not less than the predetermined reference current value;
        a multiplier that multiplies the output from the comparator by the torque component current to output the torque component current when an output of the comparator is a logic high output;
        a low pass filter that attenuates a ripple component of the torque component current to output the torque component current from which ripple component is removed; and
        a second amplifier that amplifies the torque component current output from the low pass filter with a second gain and outputs the amplified torque component current as the second compensation voltage.

2. The apparatus of claim 1, wherein the command voltage determination circuit section is configured to provide, to the inverter, with a second command voltage determined by compensating the second compensation voltage to the first command voltage, after the first command voltage is provided to the inverter.

3. The apparatus of claim 1, wherein the command voltage determination circuit section is configured to fix a target command voltage and output the fixed target command voltage when a command frequency of the inverter reaches a target frequency.

4. The apparatus of claim 1, wherein the second gain corresponds to stator resistance.

* * * * *